(12) United States Patent
Saneto et al.

(10) Patent No.: US 6,822,163 B2
(45) Date of Patent: Nov. 23, 2004

(54) ELECTRICAL JUNCTION BOX

(75) Inventors: Akinori Saneto, Shizuoka-ken (JP); Makoto Nakayama, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/627,736

(22) Filed: Jul. 28, 2003

(65) Prior Publication Data

US 2004/0060721 A1 Apr. 1, 2004

(30) Foreign Application Priority Data

Jul. 29, 2002 (JP) .................................... P2002-219537

(51) Int. Cl.[7] .............................................. H02G 3/08
(52) U.S. Cl. ........................... 174/50; 174/58; 174/59; 439/76.2; 220/3.2
(58) Field of Search ................................ 174/50, 17 R, 174/57, 54, 58, 61, 59, 66; 439/76.1, 949, 76.2; 220/3.2, 4.02, 3.8; 361/600

(56) References Cited

U.S. PATENT DOCUMENTS

| | | | | |
|---|---|---|---|---|
| 5,515,988 A | * | 5/1996 | Oda | 220/3.8 |
| 5,702,021 A | * | 12/1997 | Ito | 220/326 |
| 5,915,978 A | * | 6/1999 | Hayakawa et al. | 439/76.2 |
| 6,121,548 A | * | 9/2000 | Matsuoka | 174/59 |
| 6,515,226 B2 | * | 2/2003 | Chiriku et al. | 174/50 |
| 6,541,700 B2 | * | 4/2003 | Chiriku et al. | 174/50 |
| 6,561,822 B2 | * | 5/2003 | Depp et al. | 439/76.2 |
| 6,570,088 B1 | * | 5/2003 | Depp et al. | 174/50 |
| 6,679,708 B1 | * | 1/2004 | Depp et al. | 439/76.2 |

* cited by examiner

Primary Examiner—Anthony Dinkins
Assistant Examiner—Angel R. Estrada
(74) Attorney, Agent, or Firm—Finnegan, Henderson, Farabow, Garrett, & Dunner, L.L.P.

(57) ABSTRACT

An electrical junction box comprises a junction box body, and a cover which houses and holds the junction box body is provided. A guide rail groove is provided on any one of an inner surface of the cover and an outer surface of the junction box body, and a guide rail guided by the guide rail groove is provided on the other thereof. Further, the guide rail groove is formed so that the inlet side thereof is a wide groove part having a width wider than that of the guide rail.

10 Claims, 10 Drawing Sheets

ELECTRICAL JUNCTION BOX

BACKGROUND OF THE INVENTION

1. Field of the Invention

The present invention relates to an electrical junction box in which a junction box body is freely housed and drawn out by sliding against a corer.

2. Description of the Related Art

There is the earlier technology shown in FIG. 1 as the subject type of electrical junction box. As shown in FIG. 1, this electrical junction box 1 includes a waterproof cover 2 located, for example, within an engine compartment. The waterproof cover 2 is constituted by a lower cover 2a and an upper cover 2b. The lower cover 2a is fixed to a vehicle body (not shown). The upper cover 2b covers the top opening of the lower cover 2a and is provided so as to be freely detachable from the lower cover 2a. On the mutually opposed inner sides of the lower cover 2a, a pair of guide rail grooves 3 is provided, and a pair of guide rails 5 of a junction box body 4 is engaged with the guide rail grooves 3.

One surface of the junction box body 4 is formed as a maintenance surface 4a, on which a fuse, a relay, a connector and the like are mounted. The junction box body 4 slides in a vertical direction S because the pair of guide rail grooves 3 of the lower cover 2a guides a pair of rails 5. Due to this sliding movement, the junction box body 4 is provided so as to be freely inserted to and drawn out from the lower cover 2a.

As a maintenance inspection operation of the electrical junction box 1, checking of the fuse condition or replacement of the fuse on the maintenance surface 4a can be carried out by drawing out the junction box body 4 from the lower cover 2a. In addition, an operation of relay replacement or the like can be carried out by completely drawing out the junction box body 4 and moving the drawn-out junction box body 4 closer to a maintenance inspector. According to the foregoing, there is an advantage in that this sliding electrical junction box 1 can be installed even at a position where a periphery part 6 is located over the upper cover 2b and thus a space cannot be reserved for maintenance inspection of the junction box body 4 by merely opening the upper cover 2b.

SUMMARY OF THE INVENTION

However, in the aforementioned electrical junction box 1, a space between the top surface of the lower cover 2a and the periphery part 6 above the lower cover 2a, designated as a dimension L, is a dimension for drawing out the junction box body 4. When this drawing-out dimension cannot be sufficiently reserved the maintenance inspection operation can be carried out only in a state where the junction box body 4 is merely drawn out from the inside of the lower cover 2a by sliding movement. Therefore, there has been a problem of extremely bad workability.

Moreover, when the sufficient dimension for drawing out the electrical junction box body 4 cannot be reserved, if replacement of the junction box body 4 itself is required, the only method for the replacement is to remove the periphery part 6. However, it is not always possible to remove the periphery part 6.

The present invention was made in consideration of the above-described problems. It is an object of the present invention to provide an electrical junction box in which a junction box body can be easily removed from a cover even in the case where a sufficient dimension cannot be reserved for drawing out the junction box body.

According to one aspect of the present invention, there is provided an electrical junction box, comprising: an electrical junction box, comprising: a junction box body; and a cover which houses and holds the junction box body, wherein a guide rail groove is provided on any one of an inner surface of the cover and an outer surface of the junction box body, and a guide rail guided by the guide rail groove is provided on the other thereof; and the guide rail groove is formed so that the inlet side thereof is a wide groove part having a width wider than that of the guide rail.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

As shown in FIGS. 2 to 5, an electrical junction box 10 is located within an engine compartment (nor shown). Periphery parts including a cowl top 11 and a relay box 12 are located around the electrical junction box 10. The cowl top 11 is located at a position over the electrical junction box 10. Therefore, the front area of a junction box body 14 in a drawing-out direction is restricted to a given dimension due to the cowl top 11. In other word, arrangement of the electrical junction box 10 is one in which a dimension L for drawing out the junction box body 14 cannot be sufficiently reserved. The relay box 12 is provided adjacent to the electrical junction box 10 and protrudes slightly beyond the top surface of the electrical junction box 10. The space between the relay box 12 and cowl top 11 is the only space that can be used for maintenance inspection of the electrical junction box 10. A director in which a maintenance inspector views through this space is regarded as a viewing direction D toward the junction box body 14.

Figure 6:
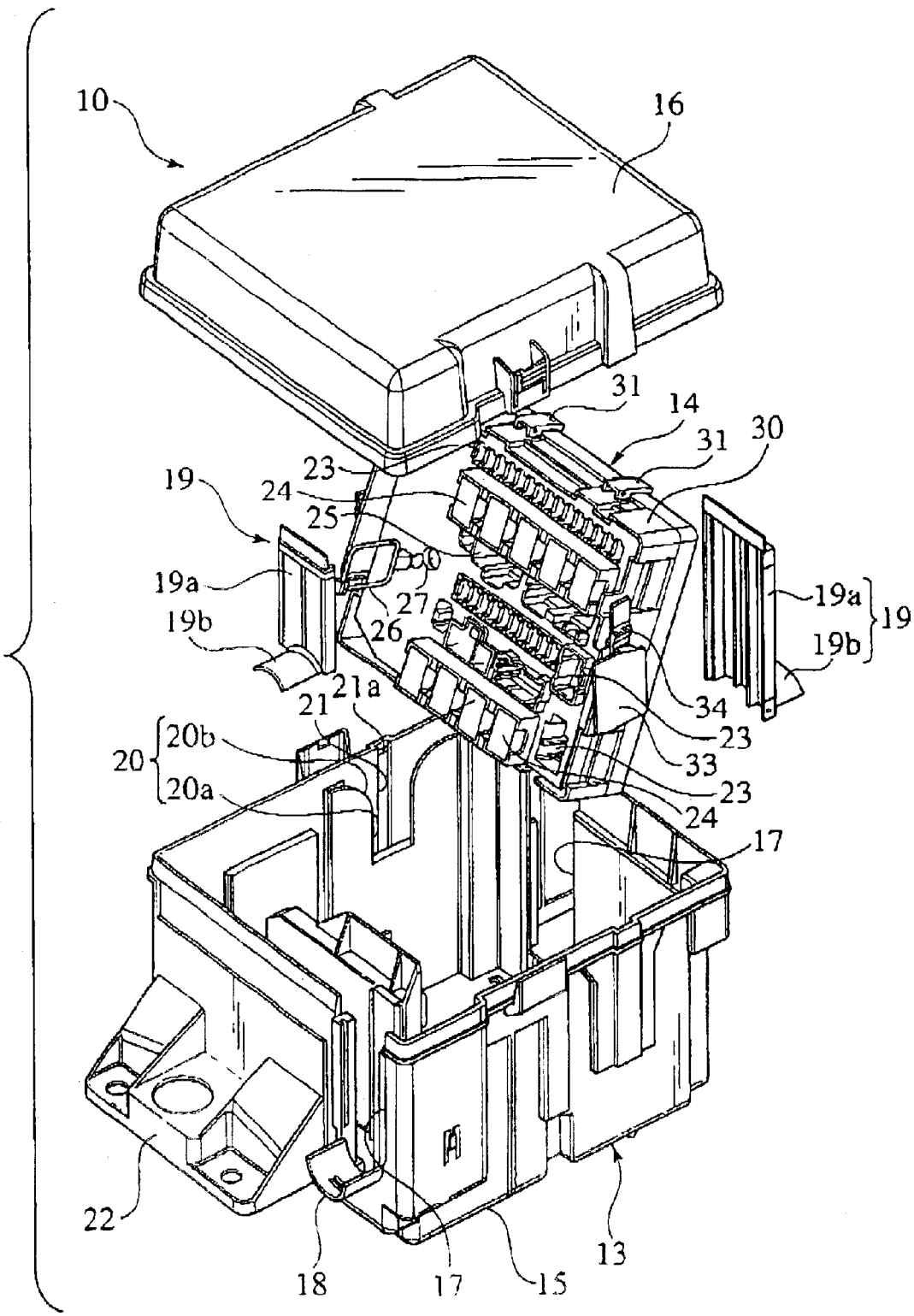
FIG. 6 is an exploded perspective view of the electrical junction box of the embodiment according to the present invention.

As shown in FIG. 6, main components of the electrical junction box 10 are a waterproof cover 13 and the junction box body 14. The waterproof cover 13 has an approximately rectangular shape and is made of synthetic resin, and the junction box body 14 made of synthetic resin is housed inside the waterproof cover 13.

The waterproof cover 13 is fixed to a vehicle body (not shown), and includes a lower cover 15 and an upper cover 16. The lower cover 15 has a rectangular shape and the top surface thereof is entirely open. The upper cover 16 covers the top surface of the lower cover 15 and is provided so as to be freely detachable from the lower cover 15. There are notches for harnesses 17, respectively formed at two places in the lower cover 15. The top ends of the notches 17 are opened, and the bottom ends of the notches 17 are respectively provided with lower harness protecting walls 18, each protruding in a semicircular shape. Sliding-and-engaging grooves 17a are respectively formed in the bilateral surfaces of the notch 17. Auxiliary sliding covers 19 are provided so as to be freely slidable by being engaged with respective sliding-and-engaging grooves 17a.

Each of the auxiliary sliding covers 19 includes a plate part 19a and an upper harness protection wall 10b. The plate part 19a covers the notch 17 where a wire harness wall is inserted, and areas except for a harness housing space in the lower harness protection wall 18. The upper harness protection wall 19b has a semicircular shape and is provided to integrally protrude at the bottom end of the plate part 19a. These lower and upper harness protection walls 18 and 11b form an approximately cylindrical harness insertion slot, through which one end of each wire harness WH is housed within the waterproof cover 13. The harness insertion slots in two places at the front and back are positioned on the side of a maintenance surface 14a and the opposite surface side thereof, respectively, with respect to the junction box body 14.

Figure 10:
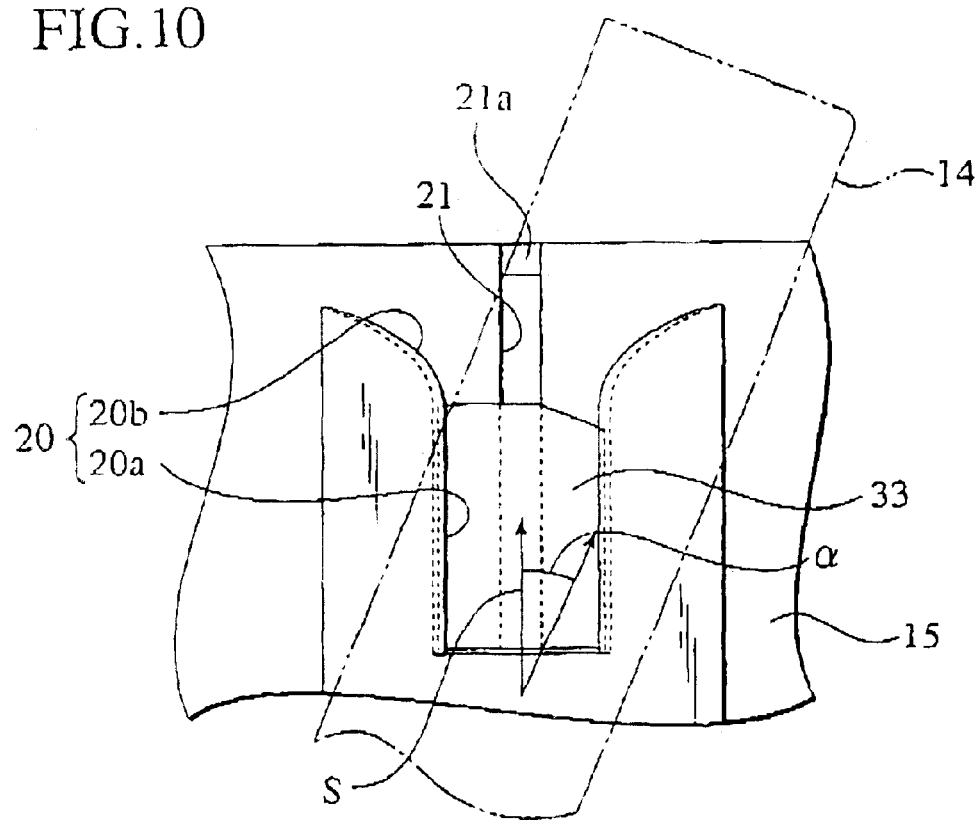
FIG. 10 is a side view illustrating an engagement state of a guide rail groove within the lower cover and a guide rail of a frame according to the embodiment.

Moreover, a pair of guide rail grooves 20 is provided on the mutually opposed inner sides of the lower cover 15. As shown in FIG. 10, the pair of guide rail grooves 20 respectively include a straight groove part 20a and a curved groove part 20b. The width of the straight groove part 20a is about the same as that of a guide rail 33, and the straight groove part 20a extends in a vertical direction. The curved groove part 20b as a wide groove part has a circular arc shape, in which the inlet is gradually enlarged. In addition, locking grooves 21 are formed in the inner sides of the guide rail grooves 20, respectively. A latching projection 21a is provided in the vicinity of the inlet of each of the locking grooves 21.

As shown in FIG. 6, a bracket 22 is provided, protruding on the front side of the lower cover 15. The relay box 12 is fixed using this bracket 22.

Figure 7:
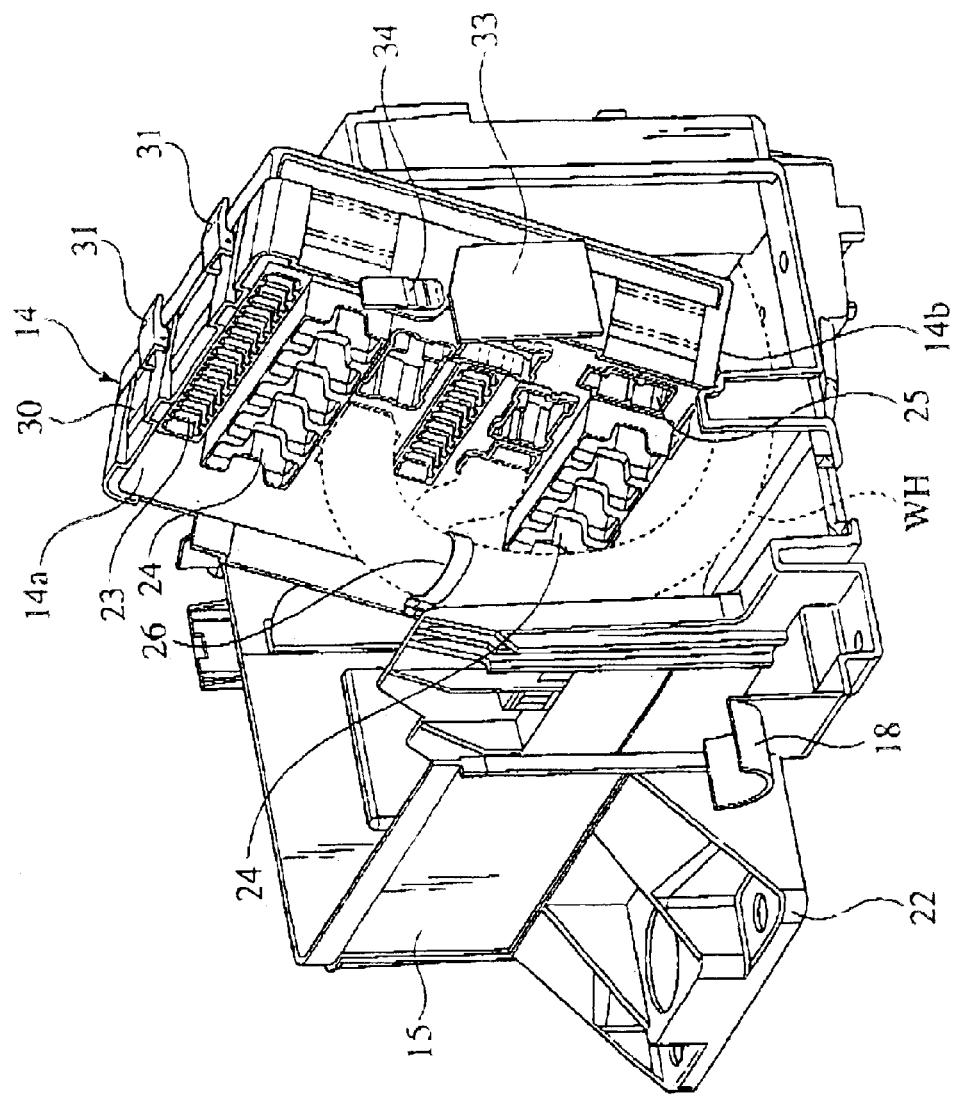
FIG. 7 is a perspective view illustrating the housed junction box body of the electrical junction box of the embodiment according to the present invention.
Figure 8:
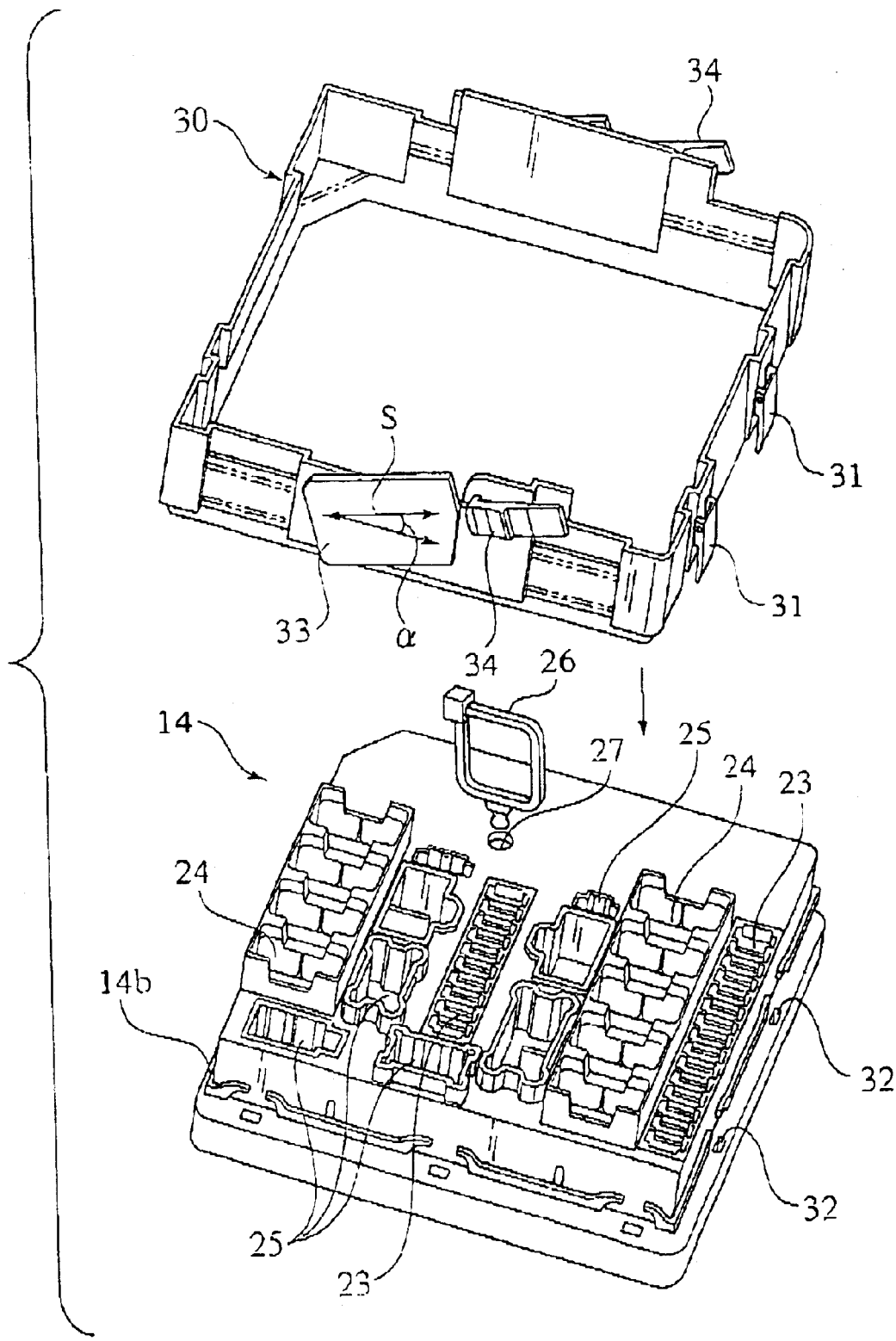
FIG. 8 is an exploded perspective view of the junction box body of the electrical junction box of the embodiment according to the present invention.

As shown in FIGS. 7 and 8, the junction box body 14 has a flat rectangular parallelepiped shape, and the surface on the front side thereof is formed as the maintenance surface 14a. The maintenance surface 14a is provided with multiple fuse mounting parts 23, relay mounting parts 24, and connector mounting parts 25. The fuse mounting parts 23 are arrayed in a row, forming a group, and these groups are located at two places. Each of the rows extends in a horizontal direction of the junction box body 14. Further, the relay mounting parts 24 are arrayed in a row, forming a group, and these groups are located at two places. Each of the rows extends in a horizontal direction of the junction box body 14.

There is an area in a part of the maintenance surface 14a where the fuse mounting parts 23, relay mounting parts 24, and connector mounting parts 25 are not located. In this area, a harness clip 26 is provided as a wire harness fixing mechanism, and a harness fixing hole 27 is formed, to which the harness clip 26 is attached in a freely detachable manner.

Figure 9A:
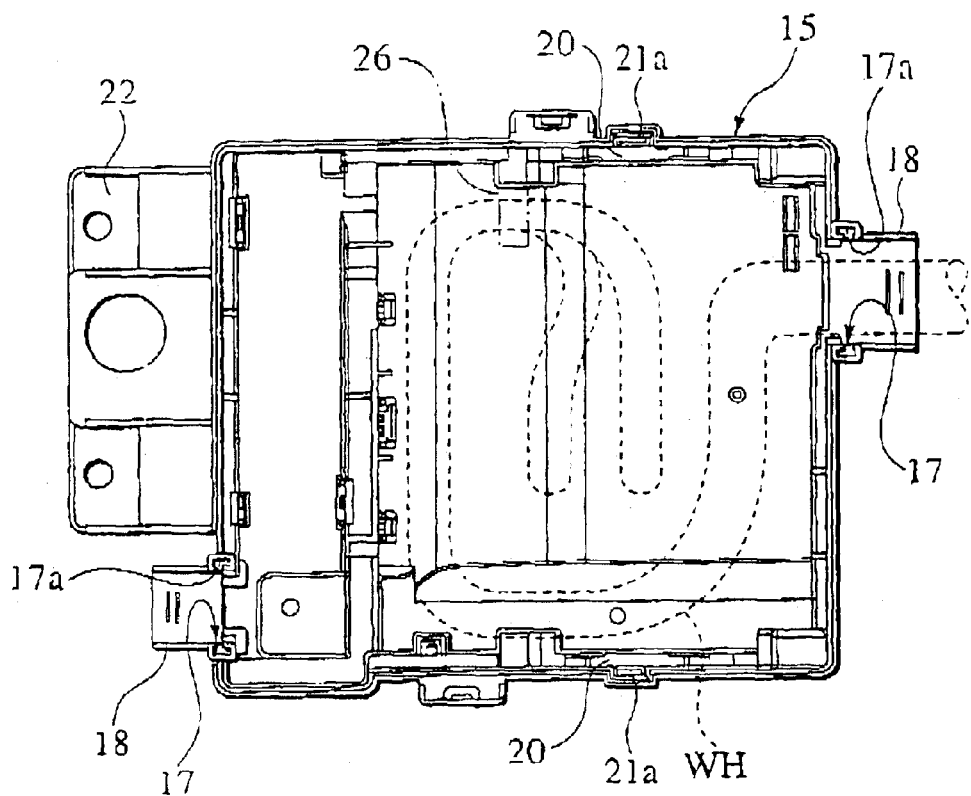
FIG. 9A is a plan view illustrating the state of a wire harness housed within the lower cover.
Figure 9B:
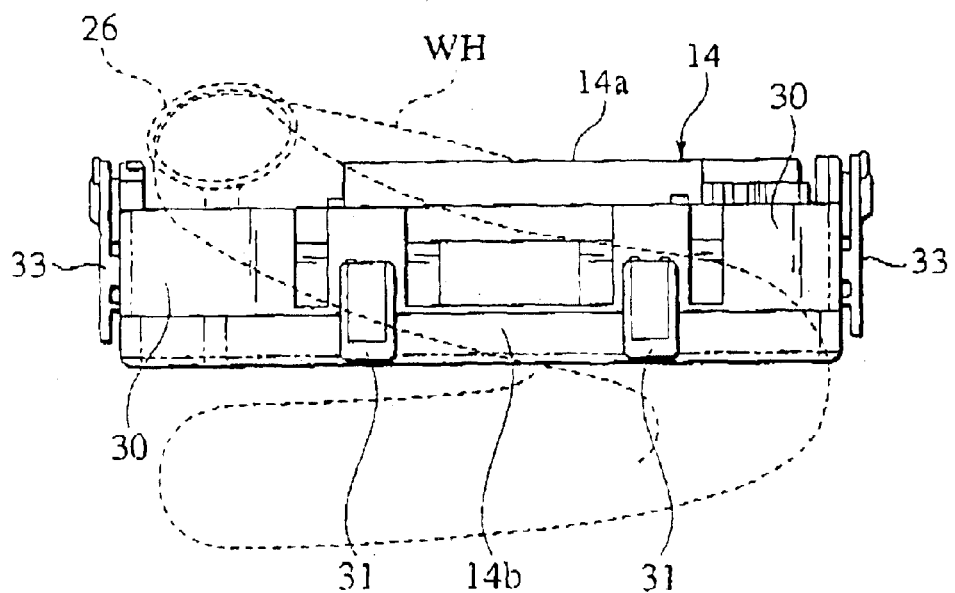
FIG. 9B is a rear view illustrating the state of the junction box body in which the wire harness is fixed.

The wire harness WH is attached to the junction box body 14 through the harness clip 26, and thereby the routing path of the wire harness WH within the waterproof cover 13 is restricted. Brief description of the routing path of the wire harness WH is as follows. As illustrated in FIGS. 9A and 9B, the wire harness WH which is mounted on the connector mounting part 25 is inserted from the harness insertion slot positioned on the side of the surface opposed to the maintenance surface 14a. The wire harness WH passes through a space on the side opposed to the maintenance surface 14a and is led to the side of the maintenance surface 14a from the side of the rear surface 14b. The branched ends of the wire harness WH are connected to the connector mounting parts 25, respectively. The wire harness WH routed in this way is fixed on the side of the junction box body 14 using the harness clip 26, thereby restricting the routing path of the wire harness WH on the side of the rear surface 14b in an oblique direction. By restricting the wire harness WH in such a routing path as above, the wire harness WH inserted from the harness insertion slot is largely folded on the opposite side of the maintenance surface 14a. Further, the routing path on the side of the maintenance surface 14a leads the wire harness. WH to each of the connector mounting parts 25 without passing through a path over the fuse mounting parts 23 and relay mounting parts 24

As shown in FIG. 8, a frame 30 in a quadrate shape is attached Co the circumference of the junction box body 14. The frame 30 has arm locks 31 provided in appropriate places thereof. Each of the arm locks 31 is elastically deformed to be engaged with a projection 32 of the junction box body 14, and thereby the frame 30 is attached to the junction box body 14. A pair of guide rails 33 is provided on the bilateral surface sides of the frame 30. These guide rails 33 are engaged with the guide rail grooves 20 of the lower cover 15. Since guide rails 33 are guided by the guide rail grooves 20, the junction box body 14 can slide within the lower cover 15. By the sliding of the junction box body 14 as above, the junction box body 14 is provided so as to be freely inserted to and drawn out from the lower cover 15. The employed frame 30 has the pair of guide rails 33 at a predetermined inclination angle α. Specifically, the inclination of each guide rail 33 is set to the inclination angle α so that the orientation of the maintenance surface 14a becomes perpendicular to a viewing direction D. Accordingly, the maintenance surface 14a is adapted to slide within the tower cover 15 while being slanted at the inclination angle α with respect to a sliding direction S.

Locking projections 34 are provided on the frame 30 in the vicinity of each guide rail. The pair of locking projections 34 is latched to respective latching projections 21a of the lower cover 15. Therefore, the junction box body 14 housed in the lower cover 15 is adapted so as to be locked to the lower cover 15.

Figure 1:
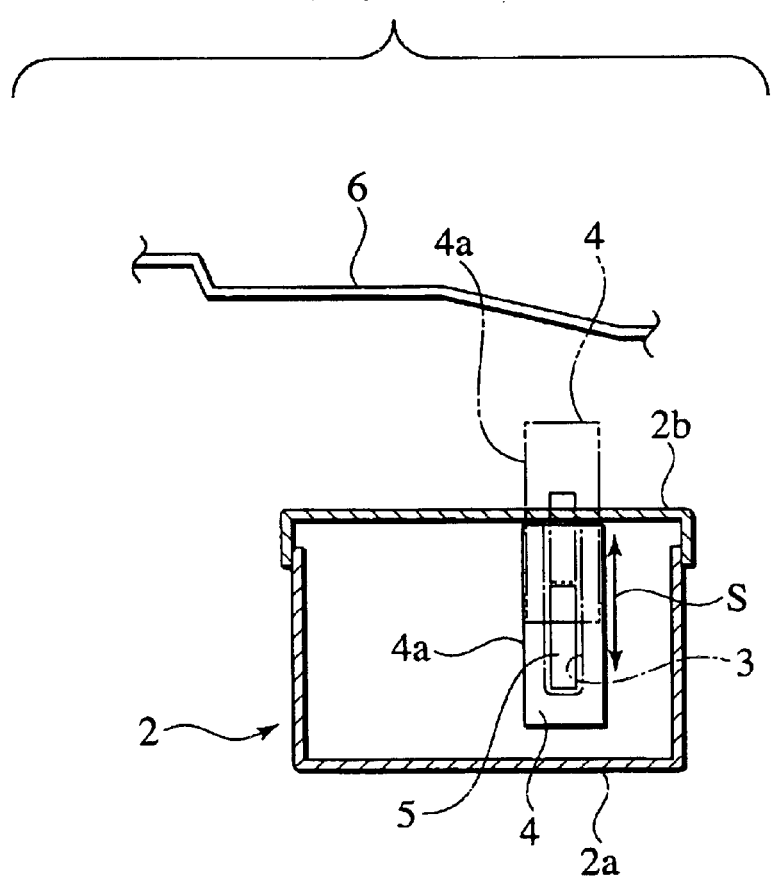
FIG. 1 is a cross-sectional view illustrating an electrical junction box of the earlier technology.
Figure 2:
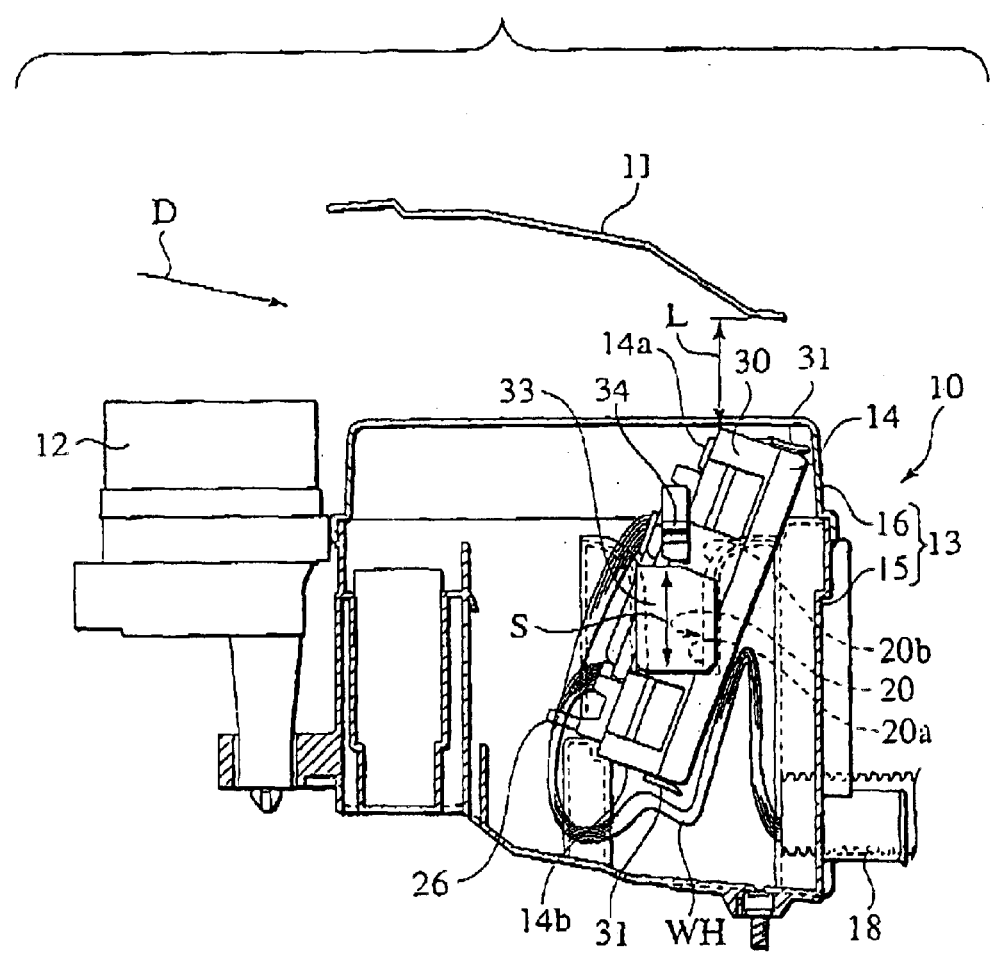
FIG. 2 is a cross-sectional view illustrating an electrical junction box, in which a junction box body is located at a position where the junction box body is housed within a waterproof cover, of the embodiment according to the present invention.
Figure 3:
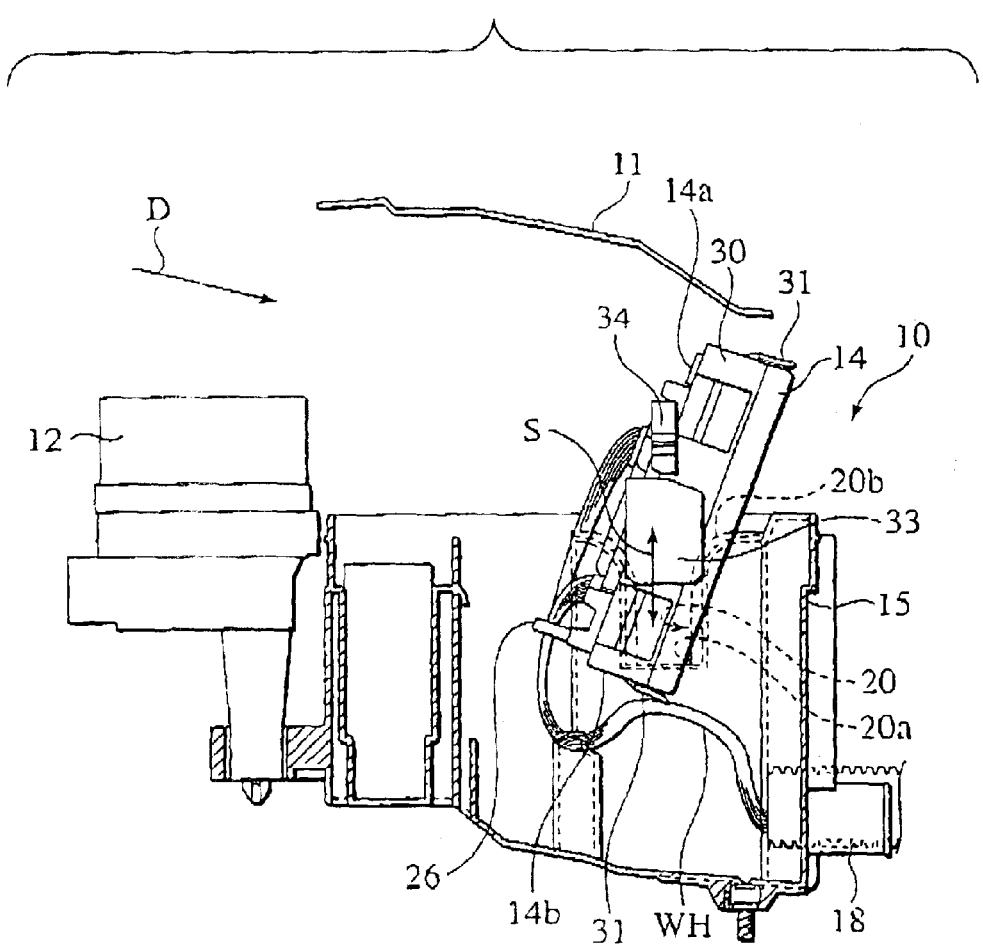
FIG. 3 is a cross-sectional view illustrating the electrical junction box, in which the junction box body is located at a position where the junction box body is drawn out from the waterproof cover, of the embodiment according to the present invention.
Figure 4:
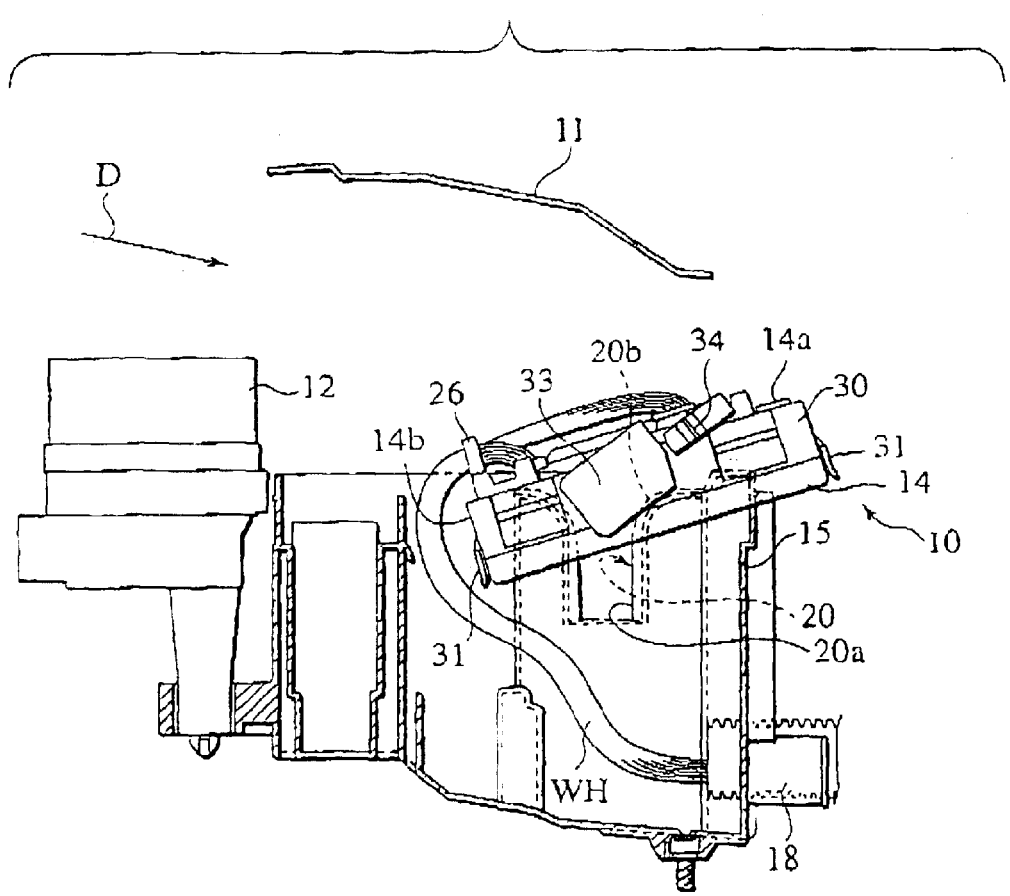
FIG. 4 is a cross-sectional view illustrating the electrical junction box, in which the junction box body is located on a curved groove, of the embodiment according to the present invention.

Next, a maintenance inspection operation for a fuse or the like in the electrical junction box 10 in the foregoing structure will be described. In the state illustrated in FIG. 2, a maintenance inspector removes the upper cover 16 from the lower cover 15. Further, the locks of the lower cover 15 are released, and the junction box body 14 is drawn out from the lower cover 15. This junction box body 14 is drawn out in the sliding direction S because the guide rails 33 are guided by the guide rail grooves 20 of the lower cover 15. The junction box body 14 after being drawn out is slanted at the inclination angle α with respect to a sliding direction S. Thus, the maintenance surface 4a becomes perpendicular to a viewing direction D. Therefore, checking of the fuse condition and replacement of the fuse can be carried out easily by the maintenance inspector. Additionally, as shown in FIG. 4, the orientation of the junction box body 14 in the drawn-out state can be changed by virtue of the curved groove parts 20b of the guide rail grooves 20. Therefore, the maintenance inspector can carry out the operation while slanting the junction box body 4 in the orientation in which the operation can be easily conducted.

Next, for replacement of a relay, the harness clip 26 is detached from the junction box body 14 which is drawn out from the lower cover 15. The wire harness WH is then released from the routing restriction and becomes free. Here, as shown in FIG. 4, the orientation of the junction box body 14 in the drawn-out state can be changed by the curved groove parts 20b as mentioned earlier. Therefore, the maintenance inspector can remove the harness clip 26 while bringing the junction box body 14 to the orientation at which the harness clip 26 can be easily removed.

Figure 5:
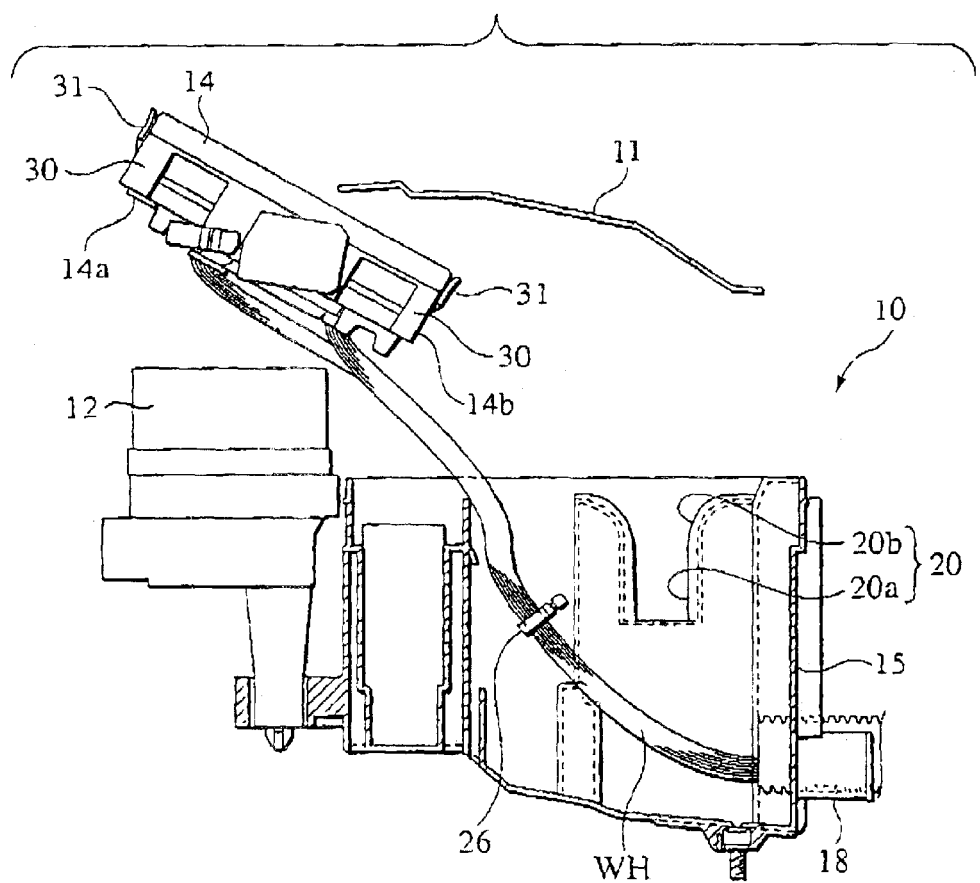
FIG. 5 is a cross-sectional view of the electrical junction box, in the state where the junction box body is completely drawn out from the waterproof cover and moved closer to a maintenance inspector, of the embodiment according to the present invention.

Next, the junction box body 14 in the drawn-out state is farther drawn out from the lower cover 15 while being slanted toward the side of the maintenance inspector, and thereby the junction box body 14 is completely drawn out from the lower cover 15. Thereafter, as shown in FIG. 5, the junction box body 14 drawn out from the lower cover 15 is moved to the position near the maintenance inspector, and a complicated operation for maintenance inspection such as replacement of a relay or the junction box body is carried out. After the operation is completely finished, the junction box body 14 is replaced to the waterproof cover 13 in the reverse procedure to that mentioned above, and thereby the whole procedure is completed.

As above described, in the electrical junction box 10, the junction box body 14 is drawn out to the position where the guide rails 33 are guided by the curved grooves part 20b of the guide rail grooves 20. The guide rails 33 are then allowed to turn in the inside of the guide rail grooves 20, which makes it possible to slant the orientation of the junction box body 14 with respect to the sliding direction S. Therefore, even when the dimension L for drawing out the junction box body 14 cannot be sufficiently reserved, the junction box body 14 can be easily removed from the lower cover 15.

Further, as mentioned earlier, the orientation of the junction box body 14 drawn out from the lower cover 15 can be changed to the orientation in which the operation is easily carried out. Therefore, there is an advantage in that checking and replacement operation of the fuse or an operation of removing the harness clip 26 can be easily conducted.

Furthermore, the wide groove part of each guide rail groove 20 is the curved groove part 20b having a circular arc shape, which gradually expands towards the inlet thereof. Hence, it is possible to slant the orientation of the junction box body 14 with respect to the sliding direction S while the guide rails 33 are guided by the curved groove parts 20b. Accordingly, the orientation of the junction box body 14 can be changed smoothly.

Figure 11:
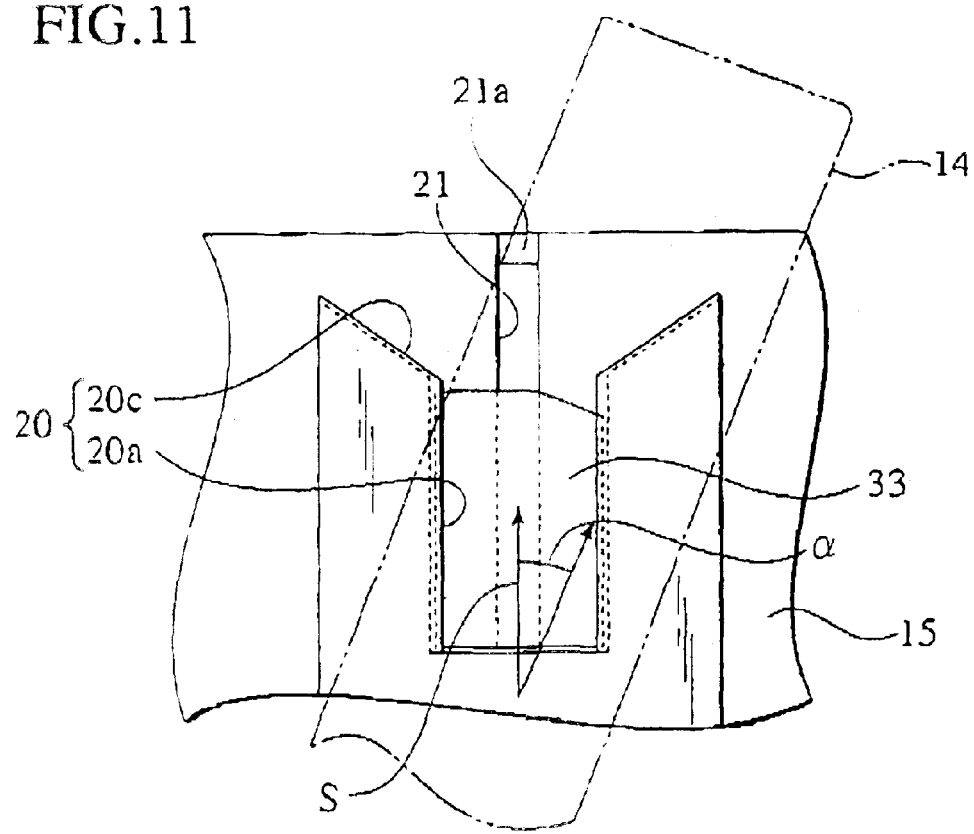
FIG. 11 is a side view illustrating an engagement state of a guide rail groove within the lower cover and a guide rail of a frame according to the other embodiment.

In the foregoing embodiment, the wide groove part is the curved groove part 20b having a circular arc shape. Yet, the wide groove part may have any shape on condition that it is wider than the width of the guide rail 33. For example, the wide groove part may have a shape linearly expanding as illustrated in FIG. 11. In other words, a groove 20c having a straight line shape may be provided instead of the curved groove part 20b.

In the above embodiment, the guide rail grooves 20 are provided on the inner surfaces of the lower cover 15, and the guide rails 33 are provided on the frame 30 of the junction box body 14. However, contrary to this, the guide rails 33 may be provided on the inner surfaces of the lower cover 15, and the guide rail grooves 20 may be provided on the frame 30. In addition, it is certainly possible to provide the guide rail grooves 20 or the guide rails 33 on the junction box body 14 directly, without providing the frame 30 therebetween.

Moreover, the maintenance surface 14a is set to slant at an inclination angle α with respect to the sliding direction S so that the maintenance surface 14a becomes substantially perpendicular to the viewing direction D. It is obvious, however, that the maintenance surface 14a of the junction box body 14 may be set to the same orientation as the sliding directions, in other words, the orientation which is not slanted with respect to the sliding direction S, due to the change of the viewing direction D and other various reasons.

The entire content of a Japanese Patent Application No. P2002-219537 with a filing date of Jul. 29, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An electrical junction box, comprising:
   a junction box body having a maintenance surface; and
   a cover which houses and holds the junction box body,
   wherein a guide rail groove is provided on any one of an inner surface of the cover and an outer surface of the junction box body, and a guide rail guided by the guide rail groove is provided on the other thereof, and
   the guide rail groove is formed so that the inlet side thereof is a wide groove part having a width wider than that of the guide rail, and wherein the guide rail groove is configured to guide the guide rail first in a sliding direction and then at an angle to the sliding direction such that the maintenance surface is oriented in a direction perpendicular to a direction for viewing the maintenance surface of the junction box body.

2. The electrical junction box of claim 1,
   wherein the wide groove part is a curved groove part having a circular arc shape, which gradually expands toward the inlet thereof.

3. The electrical junction box of claim 2,
   wherein the guide rail groove includes a straight groove part which holds the guide rail, and the curved groove part.

4. The electrical junction box of claim 1,
the wide groove part is a groove having a straight line shape, which gradually expands toward the inlet thereof.

5. The electrical junction box of claim 1,
wherein a locking groove is provided on an inner side of the guide rail groove, and a lock projection engaged with the locking groove is provided on the side of the guide rail, in order to allow the cover to hold the junction box body.

6. An electrical junction box, comprising:
a junction box body having a maintenance surface;
a cover which houses and holds the junction box body; and
a frame coupled to the junction box body, wherein the frame has at least one guide rail configured to engage with at least one guide rail groove in the cover, wherein the at least one guide rail groove is formed so that the inlet side thereof is a wide groove part having a width wider than that of the at least one guide rail, and wherein the at least one guide rail groove is configured to guide the at least one guide rail first in a sliding direction and then at an angle to the sliding direction such that the maintenance surface is oriented in a direction perpendicular to a direction for viewing the maintenance surface of the junction box body.

7. The electrical junction box of claim 6, wherein the wide groove part is a curved groove part having a circular arc shape, which gradually expands toward the inlet thereof.

8. The electrical junction box of claim 7, wherein the guide rail groove includes a straight groove part which holds the guide rail, and the curved groove part.

9. The electrical junction box of claim 6, wherein the wide groove part is a groove having a straight line shape, which gradually expands toward the inlet thereof.

10. The electrical junction box of claim 6, wherein a locking groove is provided on an inner side of the guide rail groove, and a lock projection engaged with the locking groove is provided on the side of the guide rail, in order to allow the cover to hold the junction box body.

* * * * *